United States Patent
Uenishi (10) Patent No.: US 11,085,341 B2
(45) Date of Patent: Aug. 10, 2021

(54) CONTROL DEVICE FOR INTERNAL COMBUSTION ENGINE

(71) Applicant: TOYOTA JIDOSHA KABUSHIKI KAISHA, Aichi-ken (JP)

(72) Inventor: Toru Uenishi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 16/884,048

(22) Filed: May 27, 2020

(65) Prior Publication Data
US 2020/0400053 A1     Dec. 24, 2020

(30) Foreign Application Priority Data

Jun. 21, 2019   (JP) .............................. JP2019-115769

(51) Int. Cl.
*F01N 3/028*     (2006.01)
*F01N 9/00*      (2006.01)

(52) U.S. Cl.
CPC ............ *F01N 3/028* (2013.01); *F01N 9/002* (2013.01); *F01N 2240/05* (2013.01); *F01N 2900/1606* (2013.01)

(58) Field of Classification Search
CPC ................................. F01N 3/027; F01N 3/028
See application file for complete search history.

(56) References Cited

U.S. PATENT DOCUMENTS

| 5,195,317 A | * | 3/1993 | Nobue | .................... F01N 9/002 60/275 |
| 5,423,180 A | * | 6/1995 | Nobue | .................... F01N 3/032 60/274 |

FOREIGN PATENT DOCUMENTS

| JP | H06264712 A | * | 9/1994 | |
| JP | H10212928 A | * | 8/1998 | |
| JP | 2011252387 A | * | 11/2011 | ............. F01N 9/002 |
| JP | 2016200063 A |   | 12/2016 | |

OTHER PUBLICATIONS

Machine translation of JP-2011252387-A, accessed Jan. 15, 2021. (Year: 2021).*
Machine translation of JP-H10212928-A, accessed Jan. 15, 2021. (Year: 2021).*

* cited by examiner

*Primary Examiner* — Jonathan R Matthias
(74) *Attorney, Agent, or Firm* — Hauptman Ham, LLP (57) ABSTRACT

An internal combustion engine is provided with an engine body, a housing provided in an exhaust passage of the engine body, a filter held inside the housing and trapping PM in the exhaust, and a microwave device for microwaving the inside of the housing. A control device for the internal combustion engine is configured to control the microwave device when microwaving the inside of the housing to heat the PM so that an amplitude of the microwaves becomes smaller when the amount of PM deposition at the filter is large compared to when it is small.

6 Claims, 8 Drawing Sheets

AMOUNT OF PM DEPOSITION

FIG. 5

ESTIMATED VALUE OF AMOUNT OF PM DEPOSITION

CONTROL DEVICE FOR INTERNAL COMBUSTION ENGINE

RELATED APPLICATIONS

The present application claims priority of Japanese Patent Application No. 2019-115769, filed Jun. 21, 2019, the disclosure of which is hereby incorporated by reference herein in its entirety.

FIELD

The present disclosure relates to a control device for an internal combustion engine.

BACKGROUND

Japanese Unexamined Patent Publication No. 2016-200063 discloses a conventional internal combustion engine configured to be able to heat by microwaves a PM filter body which traps particulate matter (below, referred to as "PM") in the exhaust. Further, this patent literature discloses a control device of this conventional internal combustion engine configured so as to control the frequency of the microwaves so as to keep down any temperature difference occurring inside the PM filter body when heating the PM filter body by the microwaves.

SUMMARY

By microwaving a PM filter, it is possible to heat not only the filter body, but also the PM trapped at the filter. Further, if heating the PM trapped at the PM filter by microwaves, the greater the amount of PM deposition inside the PM filter, the higher the microwave absorption rate of the PM inside the PM filter tends to become. For this reason, the greater the amount of PM deposition inside the PM filter, the more liable it is that a large amount of PM will be rapidly heated by the microwaves and burned and as a result the temperature inside the housing holding the PM filter will be liable to excessively rise resulting in the PM trapping device including the PM filter deteriorating.

The present disclosure was made focusing on such a problem and has as its object to keep a large amount of PM from ending up being rapidly heated by microwaves and the temperature inside the housing from ending up excessively rising when heating PM trapped at a PM filter by microwaves.

To solve the above problem, the internal combustion engine according to one embodiment of the present disclosure is provided with an engine body, a housing provided in an exhaust passage of the engine body, a filter held inside the housing and trapping PM in the exhaust, and a microwave device for microwaving the inside of the housing. Further, a control device for the internal combustion engine is configured to control the microwave device when microwaving the inside of the housing to heat the PM so that an amplitude of the microwaves becomes smaller when the amount of PM deposition at the filter is large compared to when it is small.

According to this aspect of the present disclosure, if the amount of PM deposition is great, the amplitude of the microwaves is made relatively small, so it is possible to keep a large amount of PM from ending up being rapidly heated by the microwaves and the temperature inside the housing from ending up excessively rising.

DESCRIPTION OF EMBODIMENTS

Below, referring to the drawings, embodiments of the present disclosure will be explained in detail. Note that, in the following explanation, similar component elements are assigned the same reference notations.

First Embodiment

Figure 1:
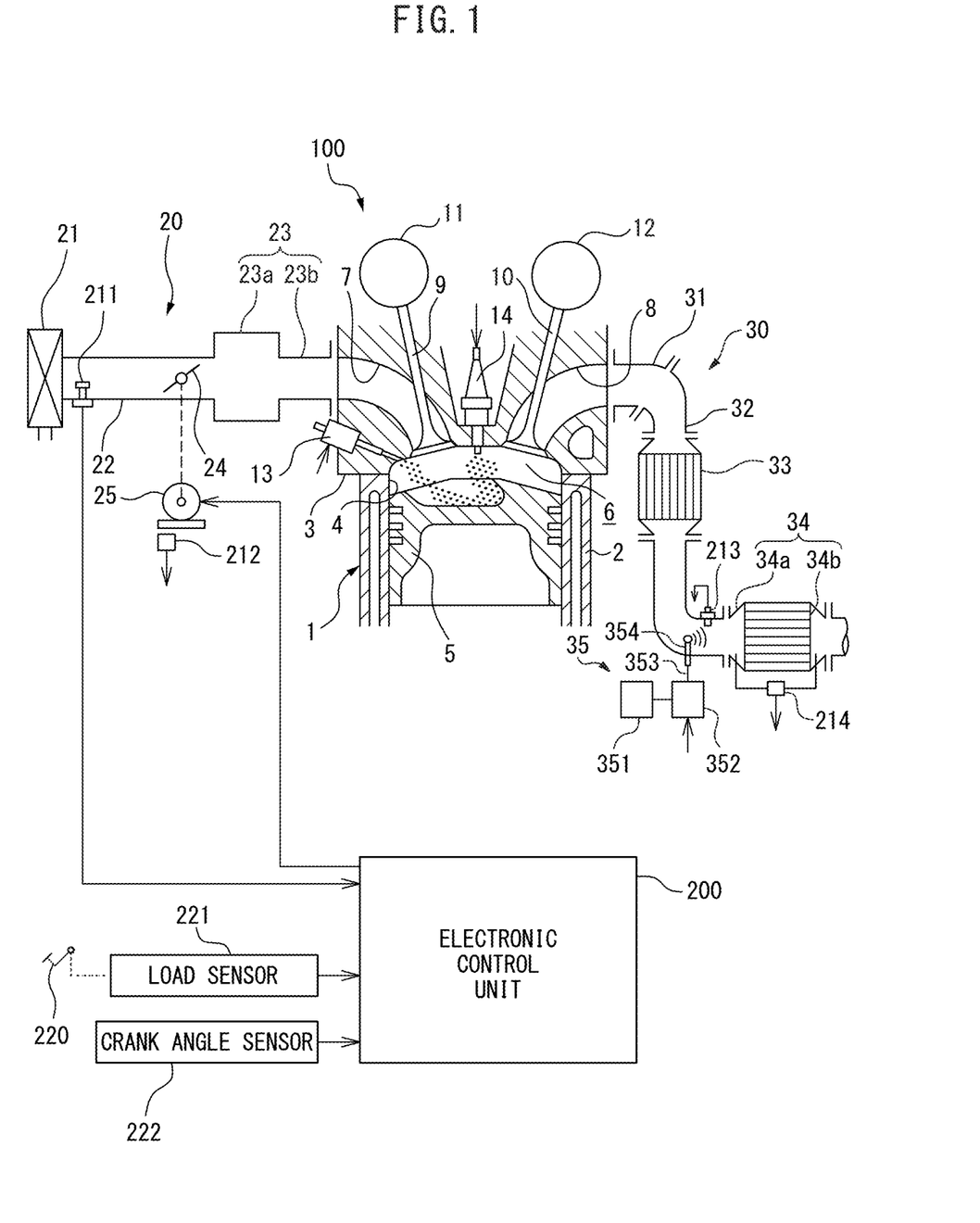
FIG. 1 is a schematic view of the configuration of an internal combustion engine according to a first embodiment of the present disclosure and an electronic control unit for controlling the internal combustion engine.

FIG. 1 is a schematic view of the configuration of an internal combustion engine 100 according to a first embodiment of the present disclosure and an electronic control unit 200 for controlling the internal combustion engine 100.

The internal combustion engine 100 according to the present embodiment is a spark ignition type gasoline engine provided with an engine body 1, intake system 20, and exhaust system 30. Note that the type of the internal combustion engine 100 is not particularly limited and may also be a homogenous charged compression ignition type gasoline engine or may be a diesel engine.

The engine body 1 is provided with a cylinder block 2 and cylinder head 3 fixed on the top surface of the cylinder block 2.

The cylinder block 2 is formed with a plurality of cylinders 4. Inside of the cylinders 4, pistons 5 moving back and forth inside of the cylinders by receiving combustion pressure are held. The pistons 5 are connected through connecting rods (not shown) to a crankshaft (not shown). Using the crankshaft, the reciprocating motions of the pistons 5 are converted to rotary motion. Spaces defined by the inside wall surface of the cylinder head 3, inside wall surfaces of the cylinders 4, and crowns of the pistons form the combustion chambers 6.

At the cylinder head 3, intake ports 7 opening to one side surface of the cylinder head 3 and opening to the combustion chambers 6 and exhaust ports 8 opening to another side surface of the cylinder head 3 and opening to the combustion chambers 6 are formed.

Further, the cylinder head 3 has attached to it intake valves 9 for opening and closing the openings between the combustion chambers 6 and intake ports 7, exhaust valves 10 for opening and closing the openings between the combustion chambers 6 and exhaust ports 8, intake cam shafts 11 for driving operations of the intake valves 9, and exhaust cam shafts 12 for driving operations of the exhaust valves 10.

Furthermore, the cylinder head 3 has attached to it fuel injectors 13 for injecting fuel to the insides of the combustion chambers 6 and spark plugs 14 for igniting the air-fuel mixtures of fuel and air injected from the fuel injectors 13 to inside of the combustion chambers 6. Note that the fuel injectors 13 may also be attached to the cylinder head 3 so as to enable fuel to be injected to the insides of the intake ports 7.

The intake system 20 is a system for guiding air through the intake ports 7 to the insides of the cylinders 4 and is provided with an air cleaner 21, intake pipe 22, intake manifold 23, air flow meter 211, electronic control type throttle valve 24, throttle actuator 25, and throttle sensor 212.

The air cleaner 21 removes sand and other foreign matter contained in the air.

The intake pipe 22 is connected at one end to the air cleaner 21 and is connected at the other end to a surge tank 23a of the intake manifold 23. Due to the intake pipe 22, air flowing through the air cleaner 21 to the inside of the intake pipe 22 (intake air) is guided to the surge tank 23a of the intake manifold 23.

The intake manifold 23 is provided with the surge tank 23a and a plurality of intake runners 23b branched from the surge tank 23a and connected to the openings of the intake ports 7 formed at the side surface of the cylinder head. The air guided to the surge tank 23a is equally distributed through the intake runners 23b to the insides of the cylinders 4. In this way, the intake pipe 22, intake manifold 23, and intake ports 7 form an intake passage for guiding air to the insides of the cylinders 4.

The air flow meter 211 is provided inside of the intake pipe 22. The air flow meter 211 detects the amount of air flowing through the inside of the intake pipe 22 (below, "intake amount").

The throttle valve 24 is provided inside of the intake pipe 22 at the downstream side from the air flow meter 211. The throttle valve 24 is driven by the throttle actuator 25 and makes the passage sectional area of the intake pipe 22 change continuously or in stages. The intake amounts taken into the cylinders 4 are adjusted by the throttle actuator 25 adjusting the opening degree TH of the throttle valve 24 (below, referred to as the "throttle opening degree"). The throttle opening degree is detected by the throttle sensor 212.

The exhaust system 30 is a system for scrubbing the combustion gas generated inside the combustion chambers 6 (below, referred to as the "exhaust") and discharging it to the outside air and is provided with an exhaust manifold 31, exhaust pipe 32, catalyst device 33, PM trapping device 34, microwave device 35, exhaust temperature sensor 213, and differential pressure sensor 214.

The exhaust manifold 31 is provided with a plurality of exhaust runners connected to openings of the exhaust ports 8 formed at the side surface of the cylinder head and a header pipe which collects the exhaust runners into a single pipe.

The exhaust pipe 32 is connected at one end to the header pipe of the exhaust manifold 31 and opens at the other end to the outside air. Exhaust discharged from the cylinders 4 through the exhaust ports 8 to the exhaust manifold 31 flows through the exhaust pipe 32 and is discharged to the outside air.

The catalyst device 33 is comprised of a support on which an exhaust purification catalyst is carried and is provided at the exhaust pipe 32. The exhaust purification catalyst is, for example, an oxidation catalyst (two-way catalyst) or a three-way catalyst. It is not limited to these. Suitable catalysts can be used in accordance with the type or application of the internal combustion engine 100. In the present embodiment, as the exhaust purification catalyst, a three-way catalyst is used. When using a three-way catalyst as the exhaust purification catalyst, the harmful substances in the exhaust such as the hydrocarbons HC, carbon monoxide CO, and nitrogen oxides $NO_X$ are removed by the catalyst device 33.

The PM trapping device 34 is provided in the exhaust pipe 32 at the downstream side of the catalyst device 33 in the direction of exhaust flow. The PM trapping device 34 is provided with a housing 34a and a wall flow type PM filter 34b held inside the housing and traps the PM contained in the exhaust by the PM filter 34b. The PM filter 34b is sometimes called a "GPF (gasoline particulate filter)" when the internal combustion engine 100 is a gasoline engine and is sometimes called a "DPF (diesel particulate filter)" when the internal combustion engine 100 is a diesel engine.

Figure 2A:
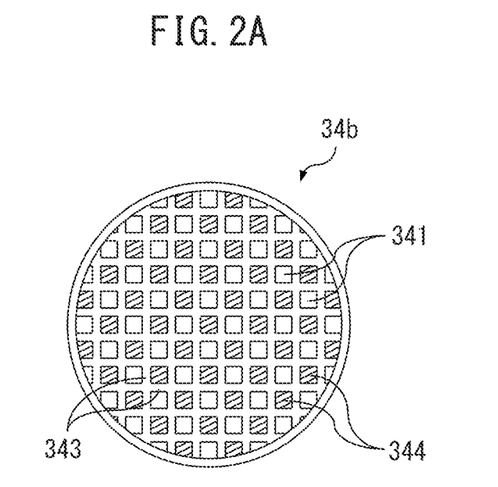
FIG. 2A is a front view of a PM filter according to the first embodiment of the present disclosure.
Figure 2B:
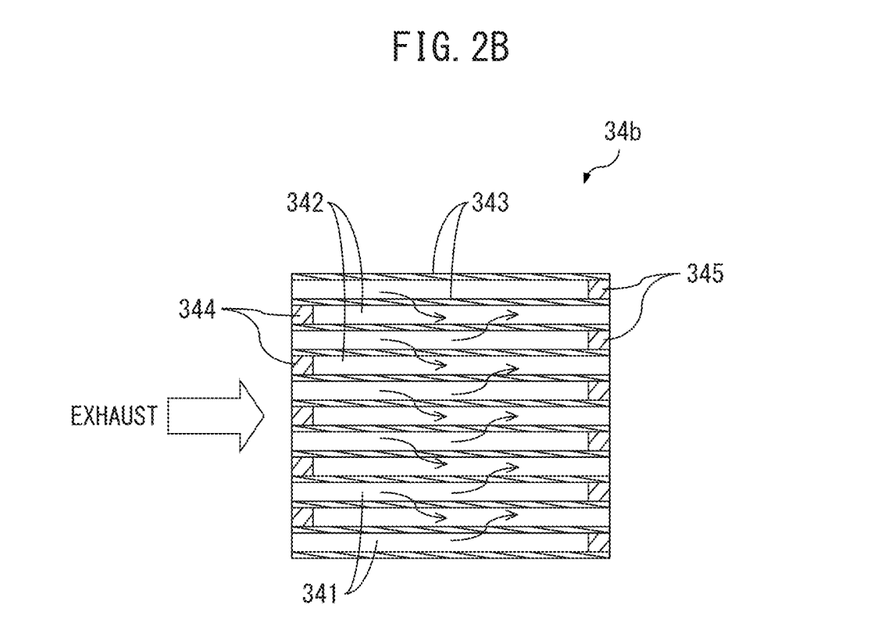
FIG. 2B is a side cross-sectional view of the PM filter according to the first embodiment of the present disclosure.

FIG. 2A and FIG. 2B are views explaining the structure of the PM filter 34b according to the present embodiment. FIG. 2A is a front view of the PM filter 34b, while FIG. 2B is a side cross-sectional view of the PM filter 34b.

As shown in FIG. 2A and FIG. 2B, the PM filter 34b has a honeycomb structure and is provided with a plurality of exhaust flow passages 341, 342 extending in parallel with each other and partition walls 343 partitioning the exhaust flow passages 341, 342.

The exhaust flow passages 341, 342 are comprised of exhaust inflow passages 341 which are opened at their upstream ends and closed at their downstream ends by downstream plugs 345 and of exhaust outflow passages 342 which are closed at their upstream ends by upstream plugs 344 and opened at their downstream ends. Note that, in FIG. 2A, the hatched parts show the upstream plugs 344. Therefore, the exhaust inflow passages 341 and the exhaust outflow passage 342 are alternately arranged through thin partition walls 343. In other words, the exhaust inflow passages 341 and the exhaust outflow passage 342 are arranged so that each exhaust inflow passage 341 is surrounded by four exhaust outflow passages 342 and so that each exhaust outflow passage 342 is surrounded by four exhaust inflow passages 341.

The partition walls 343 are formed from a porous material, for example, cordierite, silicon carbide, silicon nitride, zirconia, titania, alumina, silica, mullite, lithium aluminum silicate, and zirconium phosphate or other such ceramic. Therefore, as shown by the arrows in FIG. 2B, exhaust first flows into the exhaust inflow passages 341, then passes through interior pores of the surrounding partition walls 343 to flow out into the adjoining exhaust outflow passages 342. In this way, the partition walls 343 constitute the inside circumferential surfaces of the exhaust inflow passages 341.

Returning to FIG. 1, the microwave device 35 is provided with a microwave power supply 351, microwave oscillator 352, transmission cable 353, and microwave antenna 354.

The microwave power supply 351 is electrically connected to the microwave oscillator 352 and supplies to the microwave oscillator 352 the electric power required for making the microwave oscillator 352 generate microwaves. The microwave power supply 351 may be a dedicated power supply or may also be a battery for vehicle use if the internal combustion engine 100 is mounted in a vehicle.

The microwave oscillator 352 is driven by the electric power of the microwave power supply 351 and generates microwaves. The microwave oscillator 352 is configured so as to change the frequency "f" and amplitude A of the microwaves.

The transmission cable 353 is a cable for transmitting microwaves generated by the microwave oscillator 352 to the microwave antenna 354. One end is connected to the microwave oscillator 352, while the other end is connected to the microwave antenna 354.

The microwave antenna 354 is arranged inside of the exhaust pipe 32 positioned at the upstream side of the PM trapping device 34 in the direction of exhaust flow. The microwave antenna 354 emits microwaves transmitted through the transmission cable 353 toward the inside of the housing 34a of the PM trapping device 34.

Figure 3A:
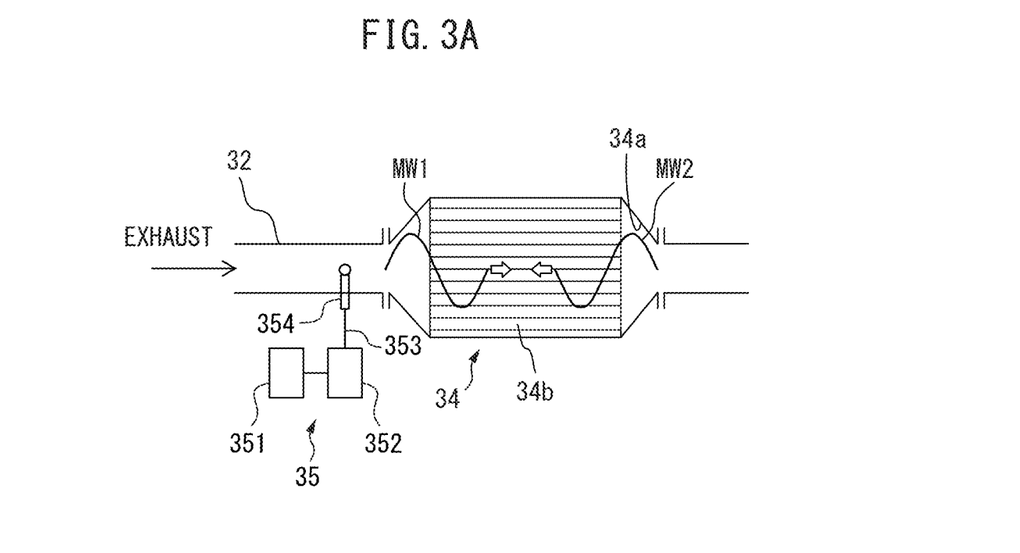
FIG. 3A is a view showing the state inside a housing when emitting microwaves from a microwave antenna toward the inside of the housing of the PM trapping device.
Figure 3B:
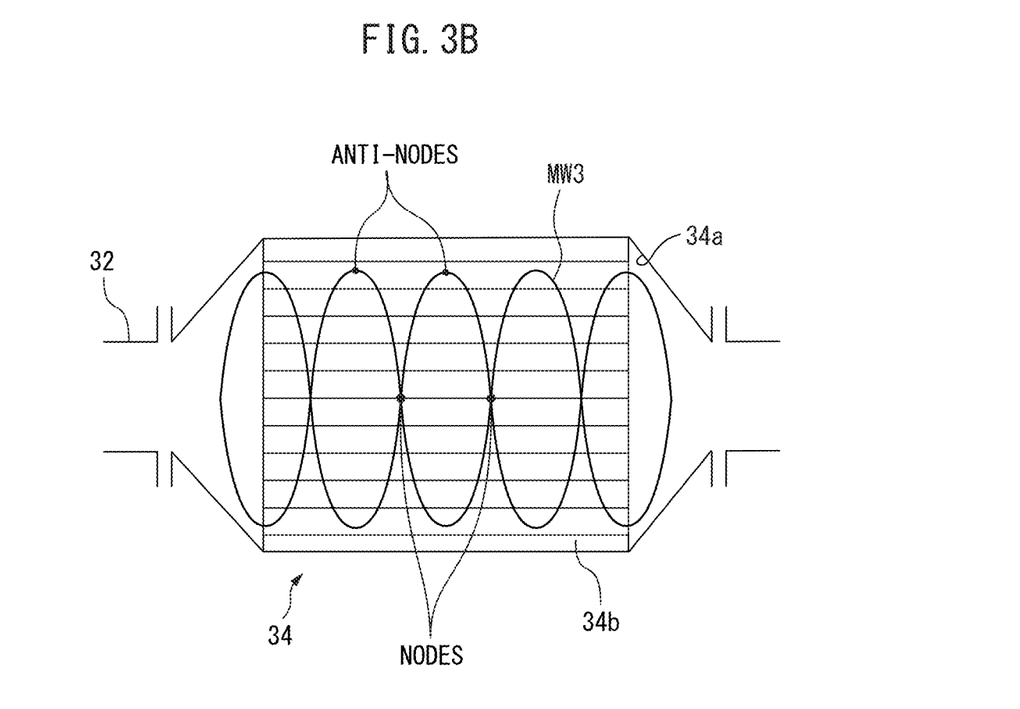
FIG. 3B is a view showing the state of a standing wave formed inside the housing when emitting microwaves from a microwave antenna toward the inside of the housing of the PM trapping device.

If driving the thus configured microwave device 35 to emit microwaves from the microwave antenna 354 toward the inside of the housing 34a of the PM trapping device 34, as shown in FIG. 3A, the traveling wave MW1 of the microwave emitted from the microwave antenna 354 enters the inside of the housing 34a of the PM trapping device 34 from its inlet end. As a result, inside of the housing 34a, the traveling wave MW1 of the microwave and the reflected wave MW2 generated by this traveling wave MW1 being reflected at the inside wall surface at the exit end side of the housing 34a become superposed whereby, as shown in FIG. 3B, a standing wave MW3 spreading three-dimensionally inside the housing 34a is formed. An object inside of the housing 34a is heated by the standing wave MW3.

Specifically, the microwave absorption rate of PM, which is mainly comprised of carbon (ratio of energy of microwaves absorbed in energy of microwaves emitted), is higher compared with the microwave absorption rate of the partitions 343 of the PM filter 34b, which are mainly comprised of iron oxide, so in the state where PM is trapped inside the PM filter 34b, by emitting microwaves from the microwave antenna 354 toward the PM trapping device 34, it is possible to mainly heat the PM inside of the housing 34a and burn off the PM.

Returning again to FIG. 1, the exhaust temperature sensor 213 is provided at the exhaust pipe 32 near the inlet side of the PM filter 34b and detects the temperature TE of the exhaust flowing into the PM filter 34b.

The differential pressure sensor 214 is provided at the PM filter 34b and detects the differential pressure PD before and after the PM filter 34b (below, referred to as the "filter differential pressure"). In the present embodiment, the estimated value Mpm of the amount of PM deposited inside the PM filter 34b (below, referred to as the "estimated value of the amount of PM deposition") is calculated by the electronic control unit 200 based on the filter differential pressure PD detected by this differential pressure sensor 214. However, the method of calculation of the estimated value Mpm of the amount of PM deposition is not limited to this method. For example, it is possible to calculate this suitably selecting from various known techniques such as calculating the amount of PM discharged from the engine body 1 corresponding to the engine operating state (engine load or engine speed etc.) and cumulatively adding the same to calculate the estimated value Mpm of the amount of PM deposition.

The electronic control unit 200 is a microcomputer provided with components connected to each other by a bidirectional bus such as a central processing unit (CPU), read only memory (ROM), random access memory (RAM), input port, and output port.

The electronic control unit 200 receives as input the output signals from various sensors such as the above-mentioned air flow meter 211 or throttle sensor 212, exhaust temperature sensor 213, and differential pressure sensor 214 and also a load sensor 221 generating an output voltage proportional to an amount of depression of an accelerator pedal 220 corresponding to the load of the engine body 1 (engine load) (below, referred to as an "amount of depression of accelerator pedal"), crank angle sensor 222 generating an output pulse every time the crankshaft (not shown) of the engine body 1 rotates by for example 15° as a signal for calculating the engine rotational speed, etc.

Further, the electronic control unit 200 controls the fuel injectors 13, the throttle valve 24, the microwave device 35, etc. based on the output signals of various sensors which are input etc. so as to control the internal combustion engine 100. Below, the microwaving control, which is one of the types of control of the internal combustion engine 100 performed by the electronic control unit 200, will be explained.

If continuing to trap PM, the wall flow type PM filter 34b eventually becomes clogged. Therefore, in the present embodiment, before the PM filter 34b becomes clogged, the trapped PM is compulsorily burned off to regenerate the PM filter 34b as regeneration treatment. Specifically, in the present embodiment, when the estimated value Mpm of the amount of PM deposition becomes a predetermined regeneration start threshold value MpmH or more, microwaves are emitted to directly heat the PM trapped at the PM filter 34b and burn off the PM.

If microwaving the PM filter 34b to heat the PM trapped at the PM filter 34b, the PM trapped at the PM filter 34b, as explained above, will be heated by the standing wave MW3 formed inside of the housing 34a. At this time, if comparing the heating speed of the PM at the positions of the standing wave MW3 with a large amplitude (that is, the positions near the anti-nodes shown in FIG. 3B) and the heating speed of the PM at the positions of the standing wave MW3 with a small amplitude (that is, positions near the nodes shown in FIG. 3B), the positions of the standing wave MW3 with a large amplitude tend to become faster in heating speed of the PM. Note that the positions of the anti-nodes (and nodes) of the standing wave MW3 can be adjusted by changing the frequency "f" of the microwaves. In the present embodiment, the frequency "f" of the microwaves is set so that the positions of the anti-nodes of the standing wave MW3 become positions where the PM trapped at the PM filter 34b can be efficiently heated.

Figure 4:
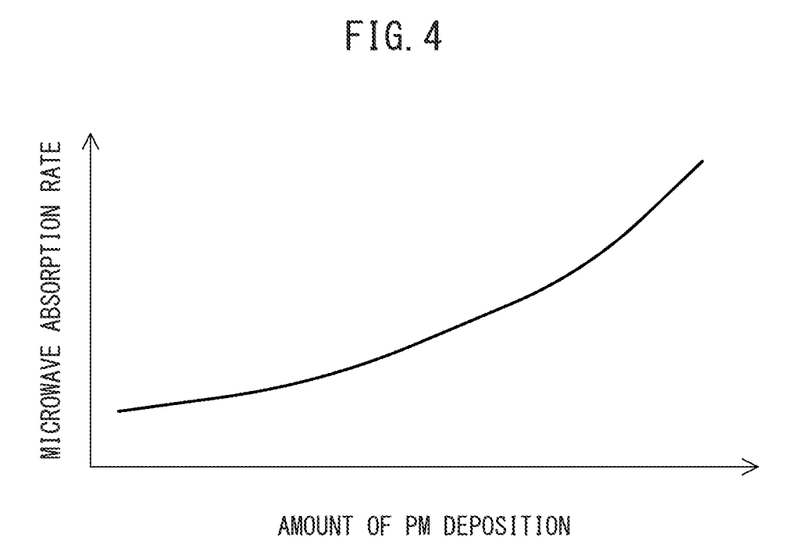
FIG. 4 is a view showing a relationship between an amount of PM deposition inside a PM filter and microwave absorption rate of PM inside a PM filter.

Here, as the amount of PM deposition of the PM filter 34b becomes greater, PM comes to be deposited overall from the upstream end side to the downstream end side of the exhaust inflow passages 341, so the probability of the PM depositing at positions where the amplitude of the standing wave MW3 becomes larger rises and the amount of the PM depositing at positions where the amplitude of the standing wave MW3 becomes larger also becomes greater (layer of PM formed at surface of exhaust inflow passages 341 at positions where amplitude of standing wave MW3 becomes larger becomes thicker). For this reason, as the amount of PM deposition of the PM filter 34b becomes greater, it becomes possible to efficiently heat the PM. Therefore, if considering the PM filter 34b as a whole, as shown in FIG. 4, the greater the amount of PM deposition inside the PM filter 34b, the higher the microwave absorption rate of PM inside the PM filter 34b tends to become.

For this reason, regardless of the amount of PM deposition of the PM filter 34b, if emitting microwaves of a certain frequency "f" and amplitude A to heat the PM, when the amount of PM deposition of the PM filter 34b is great, a large amount of PM is liable to be rapidly heated and burned and the temperature inside the housing 34a is liable to end up excessively rising resulting in deterioration of the PM trapping device 34 including the PM filter 34b.

Therefore, in the present embodiment, if the amount of PM deposition of the PM filter 34b is great, the magnitude of the amplitude A of the microwaves emitted toward the PM filter 34b corresponding to the estimated value Mpm of the amount of PM deposition was controlled so that the amplitude A of the microwaves became smaller compared to when it is small.

Figure 5:
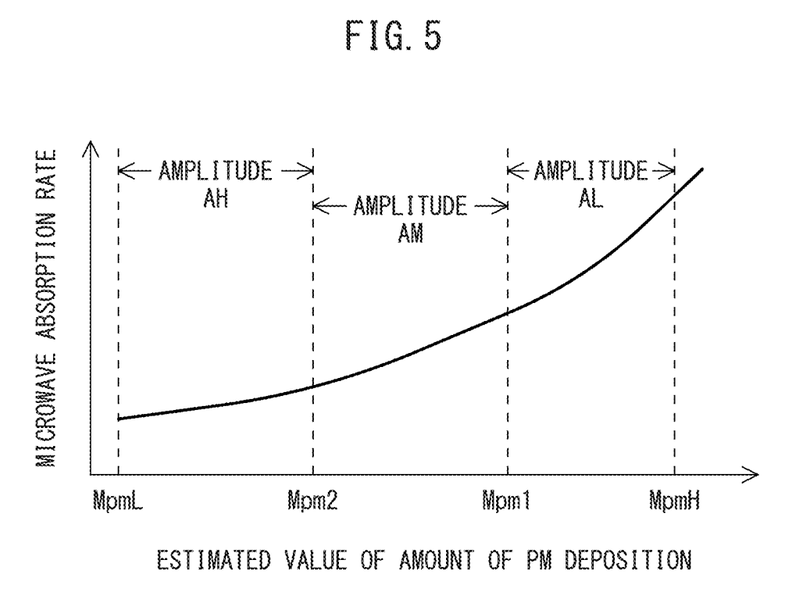
FIG. 5 is a view for explaining the setting of an amplitude of microwaves according to an estimated value of amount of PM deposition.

Specifically, in the present embodiment, as shown in FIG. 5, the amplitude A of the microwaves is controlled to a predetermined low amplitude value AL in the period from when the estimated value Mpm of the amount of PM deposition becomes the regeneration start threshold value MpmH or more and microwaving is started to when the estimated value Mpm of the amount of PM deposition falls to a predetermined first threshold value Mpm1 (<MpmH). Further, after the estimated value Mpm of the amount of PM deposition falls to the first threshold value Mpm1, the amplitude A of the microwaves is controlled to a predetermined medium amplitude value AM (>AL) until the estimated value Mpm of the amount of PM deposition falls to a predetermined second threshold value Mpm2 (<Mpm1). Further, after the estimated value Mpm of the amount of PM deposition falls to the second threshold value Mpm2, the amplitude A of the microwaves is controlled to a predetermined high amplitude value AH (>AM) until the estimated value Mpm of the amount of PM deposition falls to a predetermined regeneration stop threshold value MpmL (<Mpm2) and the microwaving is stopped.

Due to this, when the amount of PM deposition is large, it is possible to make the amplitude A of the microwaves emitted toward the PM filter 34b relatively smaller and in turn make the amplitude of the standing wave MW3 (amplitude of positions of anti-nodes) smaller, so when heating the PM trapped by the PM filter 34b by the microwaves, it is possible to keep a large amount of PM from ending up being rapidly heated by the microwaves and the temperature inside the housing from ending up excessively rising.

Figure 6:
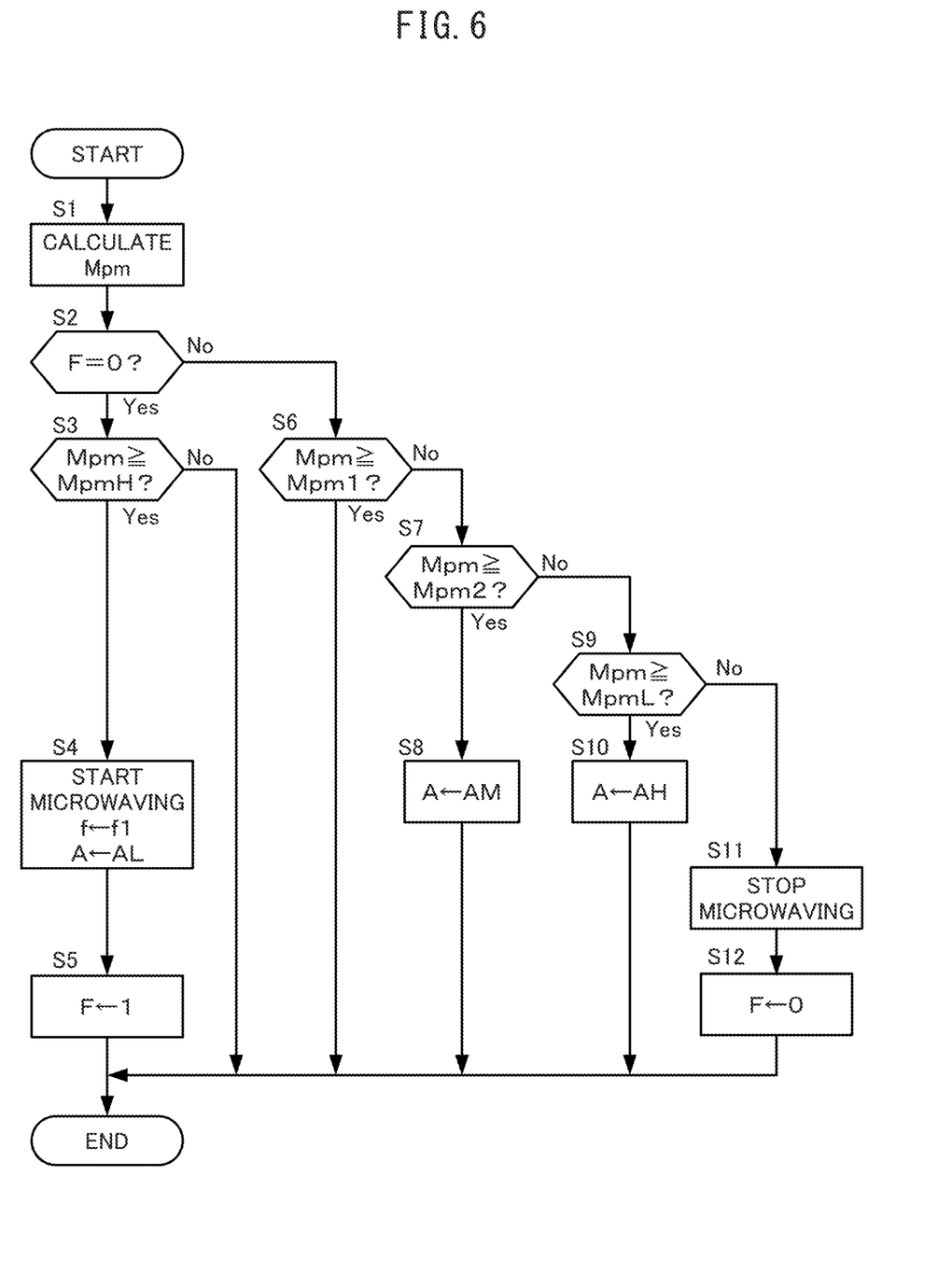
FIG. 6 is a flow chart explaining microwave control according to a first embodiment of the present disclosure.

FIG. 6 is a flow chart explaining microwaving control according to the present embodiment. The electronic control unit 200 repeatedly performs the present routine during engine operation by a predetermined processing period.

At step S1, the electronic control unit 200 reads the filter differential pressure PD detected by the differential pressure sensor 214. Further, the electronic control unit 200 refers to the map prepared in advance by experiments etc. and calculates the estimated value Mpm of the amount of PM deposition based on the filter differential pressure PD. The estimated value Mpm of the amount of PM deposition basically becomes larger the larger the filter differential pressure PD.

At step S2, the electronic control unit 200 judges if a microwave device drive flag F is set to 0. The microwave device drive flag F is a flag which is set to 1 when driving the microwave device 35, that is, when emitting microwaves from the microwave antenna 354 toward the inside of the housing 34a of the PM trapping device 34, to regenerate the PM filter 34b. It is initially set to a value of 0. If the microwave device drive flag F is set to 0, the electronic control unit 200 proceeds to the processing of step S3. On the other hand, if the microwave device drive flag F is set to 1, the electronic control unit 200 proceeds to the processing of step S6.

At step S3, the electronic control unit 200 judges if the estimated value Mpm of the amount of PM deposition is the regeneration start threshold value MpmH or more. If the estimated value Mpm of the amount of PM deposition is the regeneration start threshold value MpmH or more, the electronic control unit 200 proceeds to the processing of step S4 to regenerate the PM filter 34b. On the other hand, if the estimated value Mpm of the amount of PM deposition is less than the regeneration start threshold value MpmH, the electronic control unit 200 ends the current processing.

At step S4, the electronic control unit 200 starts the regeneration of the PM filter 34b. In the present embodiment, the electronic control unit 200 controls the frequency "f" and amplitude A of the microwaves emitted from the microwave antenna 354 to their respective predetermined first frequency f1 and above-mentioned low amplitude value AL and starts the microwaving. The first frequency f1 is a frequency where the positions of the anti-nodes of the standing wave MW3 become positions enabling efficient heating of the PM trapped at the PM filter 34b and is a frequency set in advance by experiments etc.

At step S5, the electronic control unit 200 sets the microwave device drive flag F to 1.

At step S6, the electronic control unit 200 judges if the estimated value Mpm of the amount of PM deposition is a first threshold value Mpm1 smaller than the regeneration start threshold value MpmH or is more. If the estimated value Mpm of the amount of PM deposition is the first threshold value Mpm1 or more, the electronic control unit 200 ends the current processing. That is, it continues the microwaving without changing the frequency "f" and amplitude A of the microwaves from the first frequency f1 and low amplitude value AL. On the other hand, if estimated value Mpm of the amount of PM deposition is less than the first threshold value Mpm1, the electronic control unit 200 proceeds to the processing of step S7.

At step S7, the electronic control unit 200 judges if the estimated value Mpm of the amount of PM deposition is a second threshold value Mpm2 or more, which is smaller than the first threshold value Mpm1. The electronic control unit 200 proceeds to the processing of step S8 if the estimated value Mpm of the amount of PM deposition is the second threshold value Mpm2 or more. On the other hand, the electronic control unit 200 proceeds to the processing of step S9 if the estimated value Mpm of the amount of PM deposition is less than the second threshold value Mpm2.

At step S8, the electronic control unit 200 changes the amplitude A of the microwaves emitted from the microwave antenna 354 from the low amplitude value AL to the medium amplitude value AM and continues the microwaving.

At step S9, the electronic control unit 200 judges if the estimated value Mpm of the amount of PM deposition is a regeneration stop threshold value MpmL smaller than the second threshold value Mpm2 or is more. If the estimated value Mpm of the amount of PM deposition is the regeneration stop threshold value MpmL or more, the electronic control unit 200 proceeds to the processing of step S10. On the other hand, if the estimated value Mpm of the amount of PM deposition is less than the regeneration stop threshold value MpmL, the electronic control unit 200 proceeds to the processing of step S11.

At step S10, the electronic control unit 200 changes the amplitude A of the microwaves emitted from the microwave antenna 354 from the medium amplitude value AM to the high amplitude value AH and continues the microwaving.

At step S11, the electronic control unit 200 stops driving the microwave device 35 to stop the microwaving.

At step S12, the electronic control unit 200 sets the microwave device drive flag F to 0.

The internal combustion engine 100 according to the present embodiment explained above is provided with an engine body 1, a housing 34a provided in an exhaust passage of the engine body 1, a PM filter 34b (filter) held inside the housing 34a and trapping PM in the exhaust, and a microwave device 35 for microwaving the inside of the housing 34a. An electronic control unit 200 (control device) controlling this internal combustion engine 100 is configured to control the microwave device 35 when microwaving the inside of the housing 34a to heat the PM so that an amplitude A of the microwaves becomes smaller when the amount of PM deposition at the PM filter 34b is large compared to when it is small.

Due to this, when the amount of PM deposition is great, it is possible to make the amplitude A of the microwaves emitted toward the inside of the housing 34a relatively small, so when heating the PM trapped at the PM filter 34b by microwaves, it is possible to keep a large amount of PM from ending up being rapidly heated by the microwaves and the temperature inside the housing from ending up excessively rising. Therefore, it is possible to keep the PM trapping device 34 including the PM filter 34b from deteriorating.

Second Embodiment

Next, a second embodiment of the present disclosure will be explained. The present embodiment differs from the first embodiment on the point that when the amount of PM deposition inside of the PM filter 34b becomes smaller, the partition walls 343 of the PM filter 34b are heated to indirectly heat and burn off the PM. Below, this point of difference will be focused on in the explanation.

As explained before referring to FIG. 4, if considering the PM filter 34b as a whole, the greater the amount of PM deposition inside the PM filter 34b becomes, the higher the microwave absorption rate of PM inside the PM filter 34b tends to become. Conversely speaking, if considering the PM filter 34b as a whole, the smaller the amount of PM deposition inside the PM filter 34b becomes, the lower the microwave absorption rate of PM inside the PM filter 34b tends to become. This is because as the PM deposited at positions of the standing wave MW3 where the amplitudes become large is burned and the amount of PM deposition inside the PM filter 34b becomes smaller, the ratio of the PM deposited at positions of the standing wave MW3 where the amplitudes become small and efficient heating is not possible increases.

Figure 7:
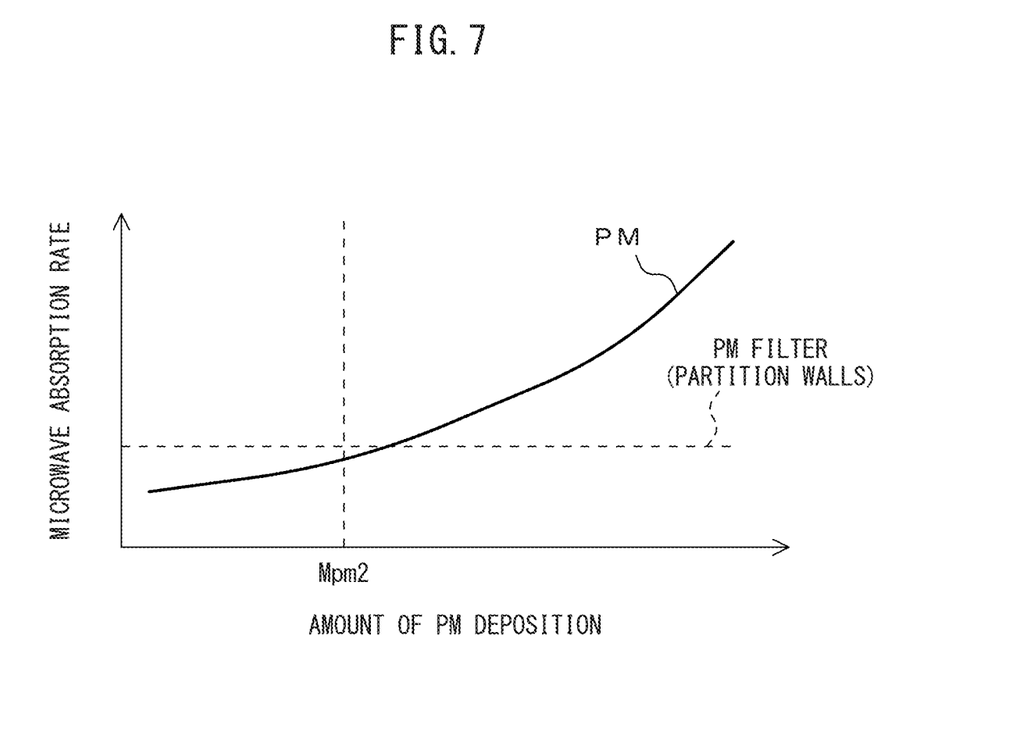
FIG. 7 is a view showing a relationship between an amount of PM deposition inside a PM filter and microwave absorption rate of PM of a PM filter body and inside a PM filter.

Therefore, as shown in FIG. 7, when the amount of PM deposition inside the PM filter 34b becomes smaller than a certain set amount, if considering the PM filter 34b as a whole, sometimes changing the frequency "f" of the microwaves so that the positions of the anti-nodes of the standing wave MW3 become positions where the partition walls 343 of the PM filter 34b can be efficiently heated makes the microwave absorption rate of the partition walls 343 of the PM filter 34b become higher than the microwave absorption rate of the PM. That is, sometimes, rather than heating the PM directly by the microwaves, heating the PM indirectly by heating the partition walls 343 of the PM filter 34b by the microwaves enables the PM to be efficiently heated and burned off.

Therefore, in the present embodiment, if the amount of PM deposition in the PM filter 34b becomes smaller than a certain set amount, the frequency "f" of the microwaves is optimized so that the positions of the anti-nodes of the standing wave MW3 became positions enabling efficient heating of the partition walls 343 of the PM filter 34b. Specifically, in the present embodiment, when the estimated value Mpm of the amount of PM deposition becomes less than the second threshold value Mpm2 during regeneration of the PM filter 34b, the frequency "f" of the microwaves is changed from the first frequency f1 to a predetermined second frequency f2 and the microwaves are used to heat the partition walls 343 of the PM filter 34b to indirectly heat the PM.

Figure 8:
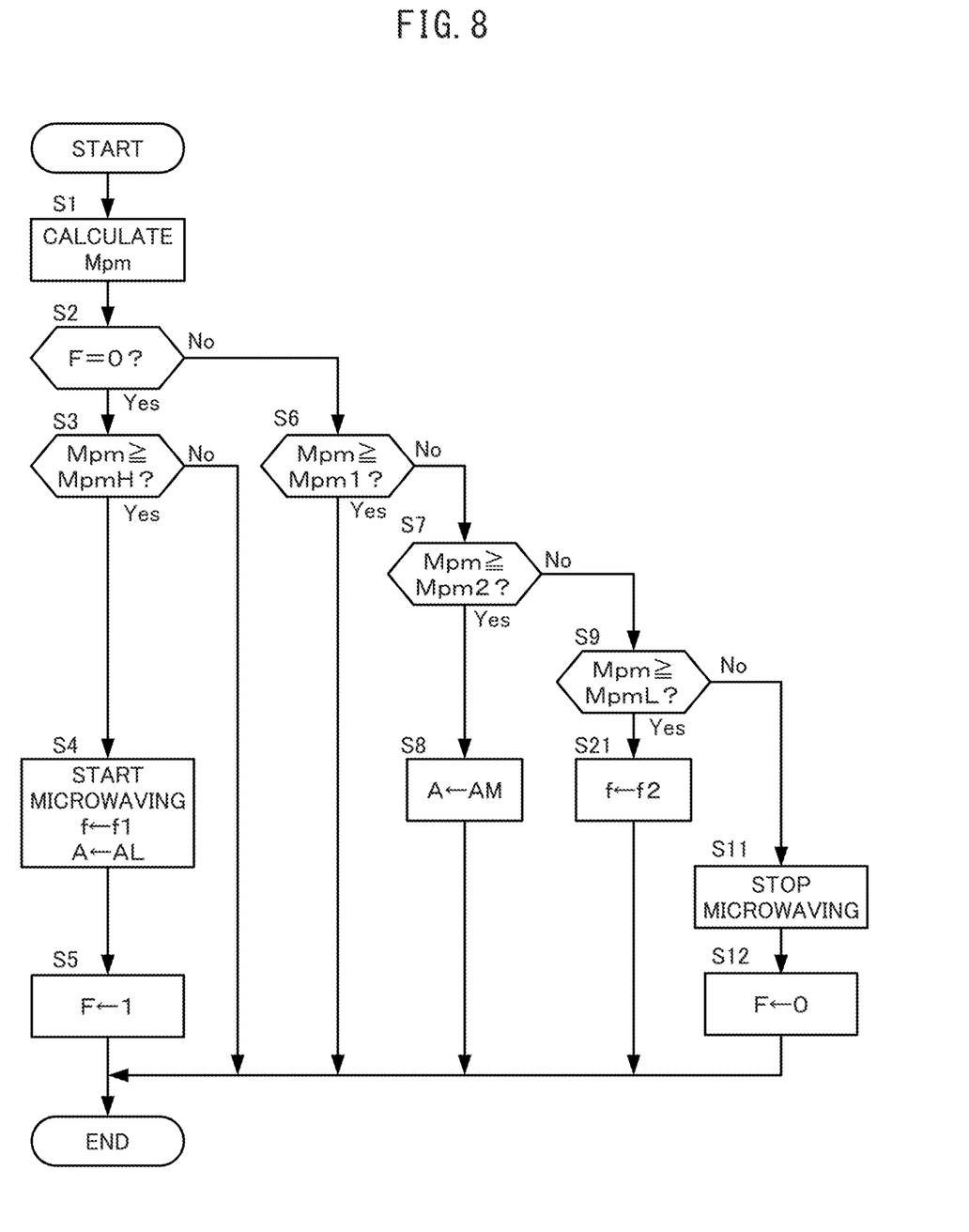
FIG. 8 is a flow chart explaining microwave control according to a second embodiment of the present disclosure.

FIG. 8 is a flow chart explaining the microwaving control according to the present embodiment. The electronic control unit 200 repeatedly performs the present routine during engine operation at predetermined processing periods. Note that, in FIG. 7, the contents of the processing from step S1 to step S9, step S11, and step S12 are similar to the first embodiment, so explanations will be omitted here.

At step S21, the electronic control unit 200 changes the frequency "f" of the microwaves emitted from the microwave antenna 354 from the first frequency f1 to the second frequency f2 and continues the microwaving.

The electronic control unit 200 (control device) according to the present embodiment explained above is configured so as to change the frequency "f" of the microwaves so that an object able to exchange heat with the PM inside the housing 34a is heated when the estimated value Mpm of the amount of PM deposition (amount of PM deposition) of the PM filter 34b (filter) is less than the second threshold value Mpm2 (predetermined amount of deposition). The object able to exchange heat with the PM is made the filter body in the present embodiment, that is, the partition walls 343 of the filter 34b, but the disclosure is not limited to this. For example, it is also possible to provide the surfaces of the exhaust inflow passages 341 with layers of microwave absorbents absorbing microwaves and heat the microwave absorbent to indirectly heat the PM.

In this way, if the amount of PM deposition in the PM filter 34b becomes smaller than a certain set amount and the microwave absorption rate of PM falls, by using microwaves to heat the partition walls 343 of the PM filter 34b so as to indirectly heat the PM, it is possible to more efficiently heat the PM and burn off the PM than by directly heating the PM by microwaves.

Third Embodiment

Next, a third embodiment of the present disclosure will be explained. The present embodiment differs from the first embodiment on the point of raising the frequency "f" of the microwaves to promote the dispersion of the microwaves entering into the housing 34a from its inlet end when the amount of PM deposition inside the PM filter 34b becomes smaller. Below, this point of difference will be focused on in the explanation.

As explained above referring to FIG. 3B, if comparing the heating speed of the PM at positions of the standing wave MW3 with a large amplitude and the heating speed of the PM at positions of the standing wave MW3 with a small amplitude, the heating speed of the PM tends to become faster at positions of the standing wave MW3 with a large amplitude. That is, the PM deposited at the positions of nodes of the standing wave MW3 is harder to heat compared with the PM deposited at the positions of anti-nodes of the standing wave MW3. Therefore, if microwaving the PM filter 34*b* to regenerate the PM filter 34*b*, the PM deposited at the positions of anti-nodes of the standing wave MW3 will easily remain without burning and PM is liable to end up depositing in an uneven state inside the PM filter 34*b*.

Therefore, in the present embodiment, to keep the PM from ending up depositing inside the PM filter 34*b* in an uneven state, when the amount of PM deposition becomes small, the frequency of the microwaves emitted to the inside of the housing 34*a* is raised to make it easier for the microwaves entering inside the housing 34*a* from its inlet end to disperse inside the housing 34*a*.

Due to this, the dispersed microwaves can be used to more uniformly heat the PM trapped at the PM filter 34*b* of the housing 34*a*. Therefore, it is possible to keep PM from depositing inside the PM filter 34*b* in an uneven state.

Figure 9:
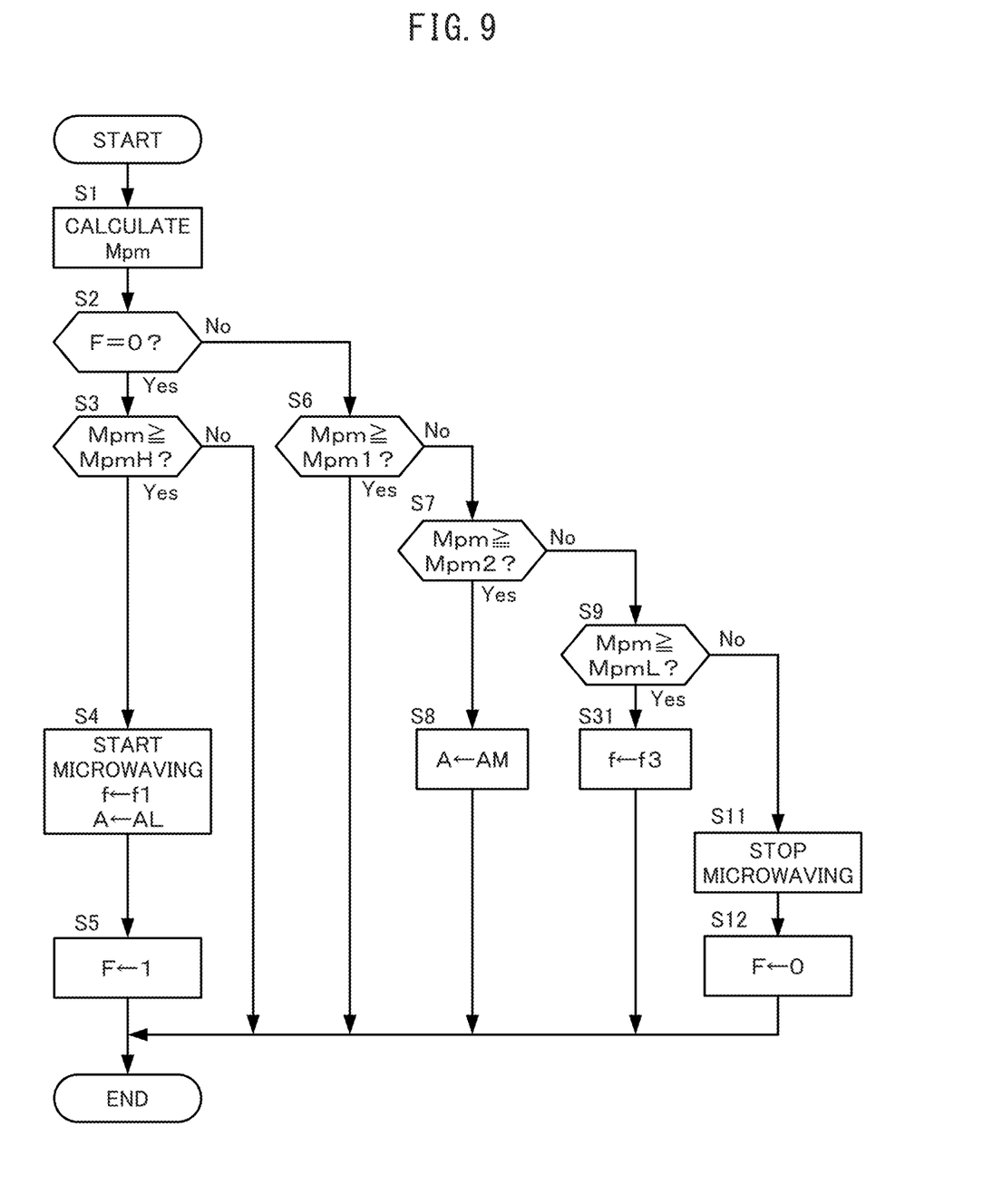
FIG. 9 is a flow chart explaining microwave control according to a third embodiment of the present disclosure.

FIG. 9 is a flow chart explaining the microwaving control according to the present embodiment. The electronic control unit 200 repeatedly performs the present routine during engine operation at predetermined processing periods. Note that, in FIG. 7, the contents of the processing of step S1 to step S9, step S11, and step S12 are similar to the first embodiment, so explanations will be omitted here.

At step S31, the electronic control unit 200 changes the frequency "f" of the microwaves emitted from the microwave antenna 354 from the first frequency f1 to a predetermined third frequency f3 larger than the first frequency f1 and continues the microwaving.

The electronic control unit 200 (control device) according to the present embodiment explained above is configured so that when the estimated value Mpm of the amount of PM deposition (amount of PM deposition) of the PM filter 34*b* (filter) is less than a second threshold value Mpm2 (predetermined amount of deposition), it makes the frequency "f" of the microwaves higher than when the estimated value Mpm of the amount of PM deposition of the PM filter 34*b* is the second threshold value Mpm2 or more.

Due to this, since it is made easier for the microwaves entering inside the housing 34*a* from the inlet end to disperse inside the housing 34*a*, it becomes possible to more evenly heat the PM trapped at the PM filter 34*b* of the housing 34*a* by the dispersed microwaves. For this reason, it is possible to keep PM from depositing inside the PM filter 34*b* in an uneven state.

Above, embodiments of the present disclosure were explained, but the present embodiments only show some of the examples of application of the present disclosure and are not intended to limit the technical scope of the present disclosure to the specific configurations of the embodiments.

The invention claimed is:

1. A control device for an internal combustion engine, the internal combustion engine comprising:
   an engine body;
   a housing provided in an exhaust passage of the engine body, the exhaust passage for discharging an exhaust;
   a filter held inside the housing and configured to trap particulate matter (PM) in the exhaust; and
   a microwave device configured to microwave the inside of the housing, wherein
   in response to an amount of PM deposition of the PM in the filter being less than a predetermined amount of deposition while microwaving the inside of the housing to heat the PM, the control device is configured to change a frequency of microwaves generated by the microwave device so that an object able to exchange heat with the PM inside the housing is heated.

2. The control device according to claim 1, wherein the object able to exchange heat with the PM is a body of the filter.

3. The control device according to claim 1, wherein
   in response to the amount of PM deposition in the filter being less than the predetermined amount of deposition while microwaving the inside of the housing to heat the PM, the control device is configured to change the frequency of the microwaves to cause anti-nodes of the microwaves to fall on the object able to exchange heat with the PM inside the housing.

4. The control device according to claim 3, wherein
   the filter comprises:
   a plurality of exhaust flow passages, and
   a plurality of partition walls partitioning the plurality of exhaust flow passages,
   the plurality of exhaust flow passages comprises:
   exhaust inflow passages opened at an upstream side and closed at a downstream side, and
   exhaust outflow passages closed at the upstream side and opened at the downstream side, and
   the object able to exchange heat with the PM inside the housing comprises:
   a partition wall among the plurality of partition walls, or
   a surface of an exhaust inflow passage among the plurality of exhaust flow passages, the surface having a layer of a microwave absorbent to absorb the microwaves.

5. The control device according to claim 1, wherein
   the filter comprises:
   a plurality of exhaust flow passages, and
   a plurality of partition walls partitioning the plurality of exhaust flow passages,
   the plurality of exhaust flow passages comprises:
   exhaust inflow passages opened at an upstream side and closed at a downstream side, and
   exhaust outflow passages closed at the upstream side and opened at the downstream side, and
   the object able to exchange heat with the PM inside the housing comprises:
   a partition wall among the plurality of partition walls, or
   a surface of an exhaust inflow passage among the plurality of exhaust flow passages, the surface having a layer of a microwave absorbent to absorb the microwaves.

6. A control device for an internal combustion engine, the internal combustion engine comprising:
   an engine body;
   a housing provided in an exhaust passage of the engine body, the exhaust passage for discharging an exhaust;
   a filter held inside the housing and configured to trap particulate matter (PM) in the exhaust; and
   a microwave device configured to microwave the inside of the housing, wherein,
   in response to an amount of PM deposition of the PM in the filter being less than a predetermined amount of deposition while microwaving the inside of the housing to heat the PM, the control device is configured to increase a frequency of microwaves generated by the microwave device more than when the amount of PM deposition in the filter is greater than or equal to the predetermined amount of deposition.

* * * * *